(12) United States Patent
Roppolo et al.

(10) Patent No.: US 11,649,902 B2
(45) Date of Patent: *May 16, 2023

(54) BALL VALVE WITH PISTONING SEATING SURFACES

(71) Applicant: Cameron International Corporation, Houston, TX (US)

(72) Inventors: Brian Roppolo, Georgetown, TX (US); Alberto Daglio, Houston, TX (US); Clayton Schenk, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,166

(22) Filed: Feb. 7, 2022

(65) Prior Publication Data
US 2022/0163122 A1 May 26, 2022

Related U.S. Application Data

(63) Continuation of application No. 16/755,170, filed as application No. PCT/US2018/054985 on Oct. 9, 2018, now Pat. No. 11,274,751.
(Continued)

(51) Int. Cl.
*F16K 5/20* (2006.01)
*F16K 5/06* (2006.01)
*F16K 27/06* (2006.01)

(52) U.S. Cl.
CPC ............ *F16K 5/204* (2013.01); *F16K 5/0684* (2013.01); *F16K 5/0689* (2013.01); *F16K 5/201* (2013.01); *F16K 5/205* (2013.01); *F16K 27/067* (2013.01)

(58) Field of Classification Search
CPC .......... F16K 5/205; F16K 5/204; F16K 5/201; F16K 5/0689; F16K 5/0684
See application file for complete search history.

(56) References Cited

U.S. PATENT DOCUMENTS 3,130,952 A * 4/1964 Meyer ..................... F16K 5/205
251/185
3,134,405 A 5/1964 White
(Continued)

FOREIGN PATENT DOCUMENTS

CN 1214200 A 4/1999
CN 103249976 A 8/2013
(Continued)

OTHER PUBLICATIONS

International Search Report and Written Opinion issued in the counterpart PCT Application PCT/US2018/054985, dated Jan. 17, 2019 (23 pages).
(Continued)

*Primary Examiner* — David Colon-Morales
(74) *Attorney, Agent, or Firm* — Helene Raybaud

(57) ABSTRACT

Valves having seats and counterseats that can be moved by fluid within the valve. In one embodiment, a valve includes a flow control assembly inside a body. The flow control assembly includes a ball rotatable between an open position and a closed position to control flow, a seat installed on the ball, and a counterseat installed in the body. The seat and the counterseat can move radially with respect to the ball and have mating surfaces that engage and seal against one another when the ball is in the closed position. The flow control assembly allows pressurized fluid in the body to cause net forces on the seat and the counterseat that push the seat and the counterseat toward each other when the ball is
(Continued)

in the closed position. Additional valve systems, devices, and methods are also disclosed.

17 Claims, 12 Drawing Sheets

Related U.S. Application Data

(60) Provisional application No. 62/570,218, filed on Oct. 10, 2017.

(56) References Cited

U.S. PATENT DOCUMENTS

| | | | |
|---|---|---|---|
| 3,155,368 A | 11/1964 | Shafer | |
| 3,195,857 A | 7/1965 | Shafer | |
| 3,301,523 A | 1/1967 | Lowrey | |
| 3,348,804 A | 10/1967 | Piccardo | |
| 3,352,155 A | 11/1967 | Penet | |
| 3,367,365 A | 2/1968 | Stevens | |
| 3,373,968 A | 3/1968 | Scaramucci | |
| 3,542,335 A * | 11/1970 | Scaramucci | F16K 5/0673 251/315.15 |
| 3,589,674 A | 6/1971 | Jones | |
| 4,059,250 A | 11/1977 | Guldener et al. | |
| 4,111,393 A * | 9/1978 | McClurg | F16K 5/0673 251/317 |
| 4,155,536 A * | 5/1979 | Saiki | F16K 5/0673 251/332 |
| 4,246,928 A | 1/1981 | Burns et al. | |
| 4,262,688 A | 4/1981 | Bialkowski | |
| 4,326,697 A * | 4/1982 | Autage | F16K 5/0631 251/315.13 |
| 4,385,747 A | 5/1983 | Renaud, Jr. et al. | |
| 4,524,946 A * | 6/1985 | Thompson | F16K 5/0678 251/316 |
| 4,557,286 A * | 12/1985 | Nagano | F16K 5/0673 251/360 |
| 4,881,718 A | 11/1989 | Champagne | |
| 5,052,657 A | 10/1991 | Winship | |
| 5,205,536 A | 4/1993 | Holec | |
| 5,332,193 A | 7/1994 | Giacomini | |
| 5,417,404 A * | 5/1995 | Varden | F16K 5/204 251/188 |
| 5,577,708 A | 11/1996 | Pfannenschmidt | |
| 5,833,214 A | 11/1998 | Kunsman | |
| 5,890,698 A | 4/1999 | Domytrak | |
| 6,082,707 A | 7/2000 | Hosie et al. | |
| 6,695,285 B1 | 2/2004 | Hotton et al. | |
| 6,966,537 B2 | 11/2005 | Sundararajan | |
| 6,974,121 B2 | 12/2005 | Koester et al. | |
| 7,690,626 B2 * | 4/2010 | Stunkard | F16K 5/0642 251/315.08 |
| 7,896,312 B2 * | 3/2011 | Dalmasso | F16K 5/201 251/363 |
| 8,727,314 B2 * | 5/2014 | Avdjian | F16K 5/201 251/316 |
| 8,960,642 B2 | 2/2015 | Avdjian | |
| 8,978,691 B2 * | 3/2015 | Avdjian | F16K 25/02 251/192 |
| 8,985,136 B2 * | 3/2015 | Avdjian | F16K 5/0631 137/315.18 |
| 9,488,284 B2 | 11/2016 | Avdjian et al. | |
| 9,534,696 B2 | 1/2017 | Avdjian | |
| 9,546,736 B2 | 1/2017 | Watanabe et al. | |
| 9,958,078 B2 | 5/2018 | Avdjian et al. | |
| 9,964,219 B2 | 5/2018 | Avdjian | |
| 10,018,276 B2 * | 7/2018 | Funato | F16K 5/0678 |
| 10,066,751 B2 | 9/2018 | Seko et al. | |
| 10,292,021 B2 | 5/2019 | Lis et al. | |
| 11,274,751 B2 * | 3/2022 | Roppolo | F16K 5/0689 |
| 2003/0192604 A1 | 10/2003 | Tran | |
| 2006/0048825 A1 | 3/2006 | Lomax | |
| 2011/0049408 A1 | 3/2011 | Gutmann et al. | |
| 2011/0147635 A1 | 6/2011 | Seveso et al. | |
| 2011/0260088 A1 | 10/2011 | Cunningham | |
| 2011/0266482 A1 | 11/2011 | Dalluge et al. | |
| 2012/0085957 A1 | 4/2012 | Dhawan et al. | |
| 2012/0168660 A1 | 7/2012 | Balan et al. | |
| 2012/0211690 A1 | 8/2012 | Anderson et al. | |
| 2013/0312832 A1 | 11/2013 | Avdjian et al. | |
| 2015/0300508 A1 * | 10/2015 | He | F16K 5/0689 251/314 |
| 2016/0186870 A1 * | 6/2016 | Ricard | F16K 5/0678 251/315.01 |
| 2021/0222779 A1 | 7/2021 | Roppolo et al. | |

FOREIGN PATENT DOCUMENTS

| | | |
|---|---|---|
| CN | 103727259 A | 4/2014 |
| CN | 103765062 A | 4/2014 |
| CN | 104334941 A | 2/2015 |
| CN | 105179727 A | 12/2015 |
| DE | 1122788 B | 1/1962 |
| EP | 2463560 A1 | 6/2012 |
| FR | 1375004 A | 10/1964 |
| FR | 2328904 A1 | 5/1977 |
| GB | 945508 A | 1/1964 |
| GB | 1338990 A * | 11/1973 |
| GB | 1338990 A | 11/1973 |
| IT | UB20161008 A1 | 8/2017 |
| JP | 57144358 | 9/1982 |
| JP | H09236182 A | 9/1997 |
| WO | 0138761 A1 | 5/2001 |
| WO | 2012078392 A1 | 6/2012 |

OTHER PUBLICATIONS

International Preliminary Report on Patentability issued in the PCT Application PCT/US2018/054985, dated Apr. 23, 2020 (20 pages).
Extended Search report issued in European Patent Application No. 18865470.1 dated Jun. 11, 2021, 8 pages.
First office action issued in CN Application 201880079193.0, dated Sep. 27, 2021 (36 pages).

* cited by examiner

BALL VALVE WITH PISTONING SEATING SURFACES

CROSS REFERENCE PARAGRAPH

This application is a continuation of application Ser. No. 16/755,170, filed on Apr. 10, 2020, which is the National Stage Entry of PCT/US2018/054985, filed on Oct. 9, 2018 and claims the benefit of U.S. Provisional Application No. 62/570,218, entitled "CONTOURED INTEGRATED SEAT FOR BALL VALVE," filed Oct. 10, 2017, the disclosures of which are hereby incorporated herein by reference.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once desired subterranean resources are discovered, drilling and production systems are often employed to access and extract the resources. These systems may be located onshore or offshore depending on the location of desired resources. And once extracted, the resources are often transported via pipelines to other locations, such as refineries. The pipelines typically include valves to control the flow of resources through the pipelines.

As may be appreciated, valves include a flow control mechanism for selectively allowing flow through the valves. For instance, a traditional ball valve includes a ball that may be rotated between open and closed positions to allow or prevent flow through the valve. Seals in the ball valves can prevent leaking, and some ball valves include seats that seal against the balls when the balls are rotated into the closed position to prevent flow.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to valves having seats for sealing and preventing flow through the valves. In some embodiments, ball valves include seats for sealing against counterseats in the valves. The seats can be carried by rotatable balls of the ball valves, and the seats or counterseats in some cases have toroidal sealing surfaces. Further, ball valves in some embodiments include rotatable balls for controlling flow and seats and counterseats that are permitted to move toward and away from the balls during valve operation to facilitate sealing of these seating components when the valves are closed and to facilitate separation of these seating components as the valves are opened.

Various refinements of the features noted above may exist in relation to various aspects of the present embodiments. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
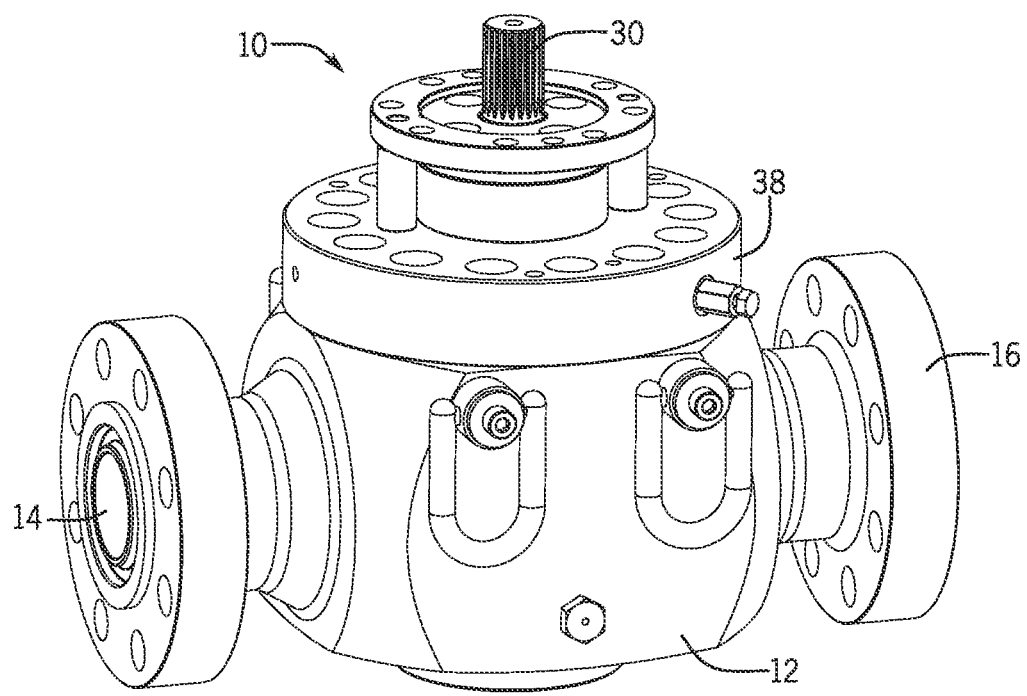
FIG. 1 is a perspective view of a ball valve in accordance with an embodiment of the present disclosure.
Figure 2:
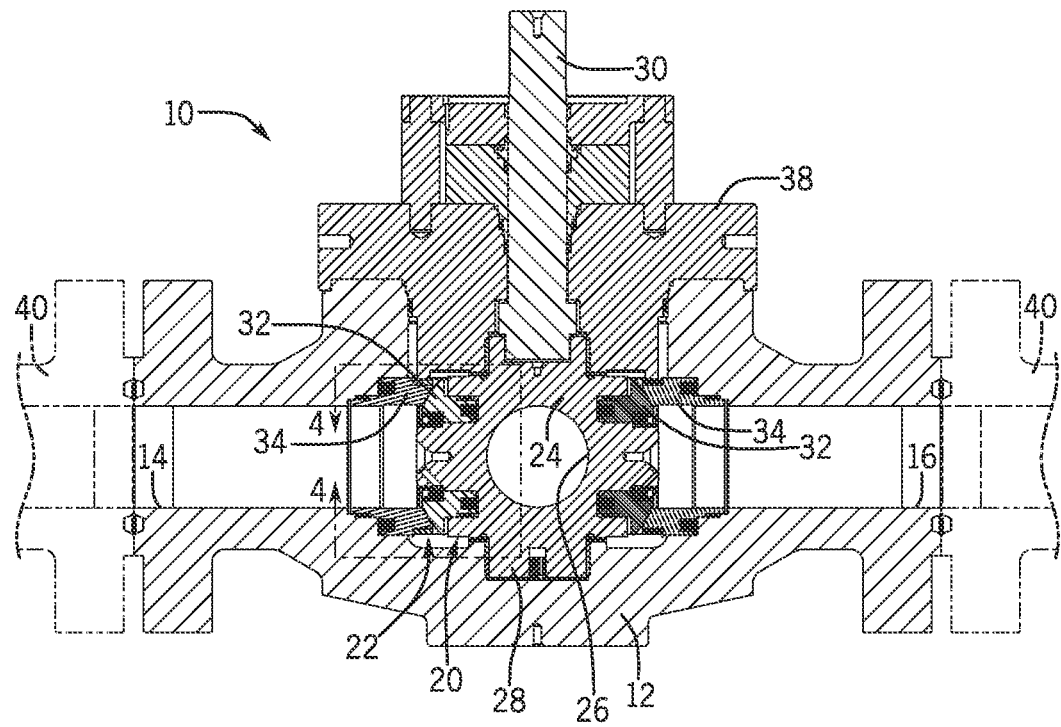
FIG. 2 is a vertical cross-section of the ball valve of FIG. 1 and depicts a flow control assembly with a ball in a closed position inside a hollow main body in accordance with one embodiment.
Figure 3:
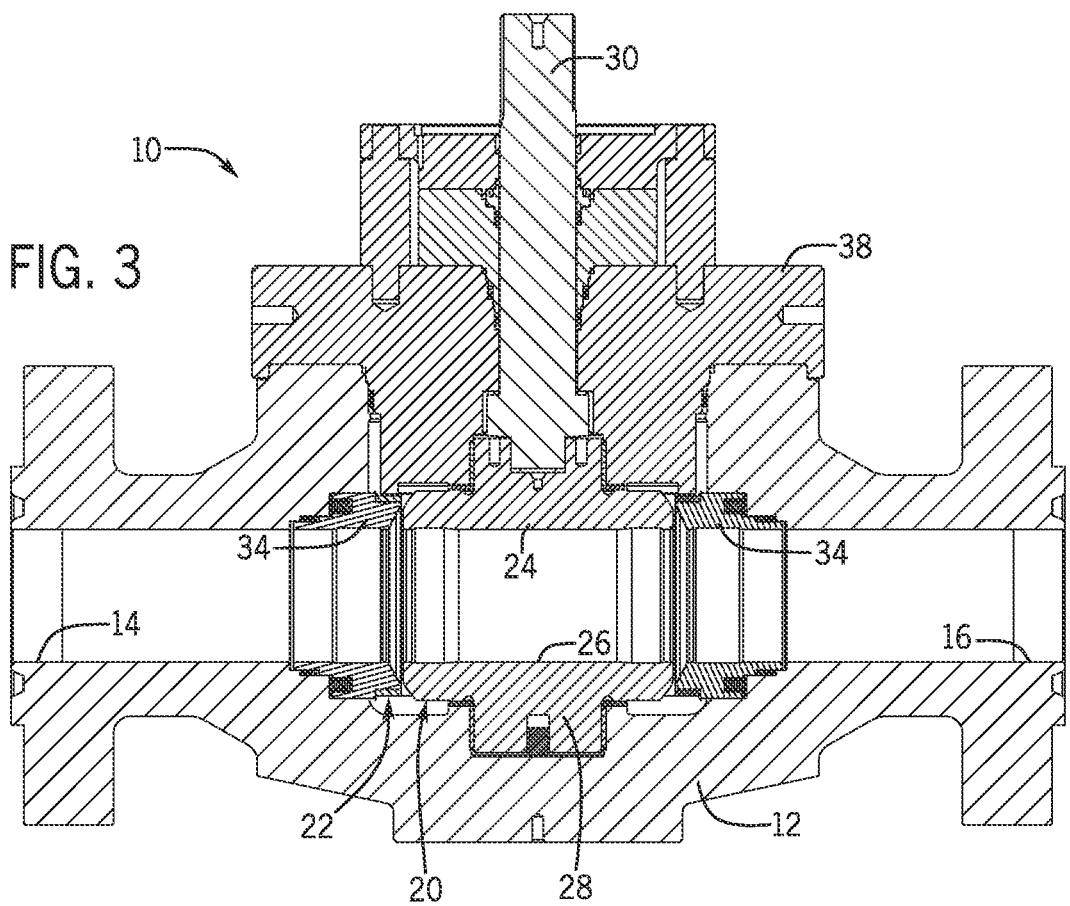
FIG. 3 is also a vertical cross-section of the ball valve of FIG. 1, but depicts the ball of the flow control assembly in an open position inside the hollow main body in accordance with one embodiment.

Turning now to the drawings, a valve 10 is illustrated in FIGS. 1-3 by way of example. The depicted valve 10 is a ball valve and is described as such below for the sake of explanation. It will be appreciated, however, that some of the features detailed herein may be used with other valves, such as gate valves. The valve 10 includes a hollow main body 12 that houses internal flow control components that regulate flow between ends 14 and 16 of the valve. For convenience, the direction of flow through the valve will be assumed to be from end 14 to end 16, the end 14 will be referred to as inlet 14, and the end 16 will be referred to as outlet 16. But in practice the flow direction could be reversed, with end 16 serving as the inlet and end 14 serving as the outlet.

As shown in FIGS. 2 and 3, the ball valve 10 includes a flow control assembly 20 installed within a cavity 22 of the hollow main body 12. More specifically, in this depicted embodiment the flow control assembly 20 has a ball 24 with a bore 26. The ball 24 is mounted on a ball support via a trunnion 28 and can be rotated by a stem 30 to pivot between a closed position (shown in FIG. 2) that prevents flow from the inlet 14 to the outlet 16 through the bore 26 and an open position (shown in FIG. 3) that aligns the bore 26 with the inlet 14 and the outlet 16 to facilitate flow through the valve. In this manner, rotation of the ball 24 controls flow through the valve 10.

The flow control assembly 20 also includes sealing assemblies having annular seats 32 and counterseats 34 for preventing flow through the ball valve 10 when the ball 24 is rotated to the closed position. That is, with the ball 24 in the closed position inside the cavity 22, the seats 32 seal against the counterseats 34 to prevent flow from the inlet 14 to the outlet 16. As presently depicted, the upstream sealing assembly having the seat 32 and counterseat 34 on the inlet side of the valve 10 is identical to the downstream sealing assembly having the seat 32 and counterseat 34 on the outlet side of the valve 10. This facilitates use of the valve 10 for flow in either direction (i.e., from end 14 to end 16, or the reverse). But in other embodiments the upstream and downstream sealing assemblies may differ. Additionally, as discussed in greater detail below, the seats 32 and counterseats 34 of at least some embodiments are installed in the body 12 in a manner that allows movement of these seating components toward and away from the ball 24 during valve operation.

The ball valve 10 is depicted in FIGS. 1-3 as a top-entry, trunnion-mounted ball valve, with the flow control assembly 20 inserted into the cavity 22 through an opening in the main body 12 and then enclosed by a bonnet or cover 38. The stem 30 extends through the cover 38, allowing the stem 30 to be rotated (manually or by an actuator) to control flow through the valve 10 via the position of the ball 24. The valve 10 can be installed in a pipeline 40 or between other devices for controlling flow. In some embodiments, the valve 10 is connected in-line with pipes of a pipeline 40 or with other devices via flanged ends at inlet 14 and outlet 16, which can be fastened to pipes or other devices in any suitable manner (e.g., via clamps or bolted connections). The valve 10 in other instances could be inserted in a pipeline via compact flanges, hub connections, or welding. In addition to the seats 32 and the counterseats 34, various other seals can be used with the valve 10 to inhibit leaking, such as seals between the stem 30 and the cover 38, between the cover 38 and the main body 12, and between the flanged ends of the valve 10 and pipes of the pipeline 40. And while depicted in FIGS. 1-3 as a top-entry, trunnion-mounted ball valve, in other embodiments the valve 10 may be provided in a different form, such as a side-entry ball valve, a welded-body ball valve, or a cartridge valve.

Figure 4:
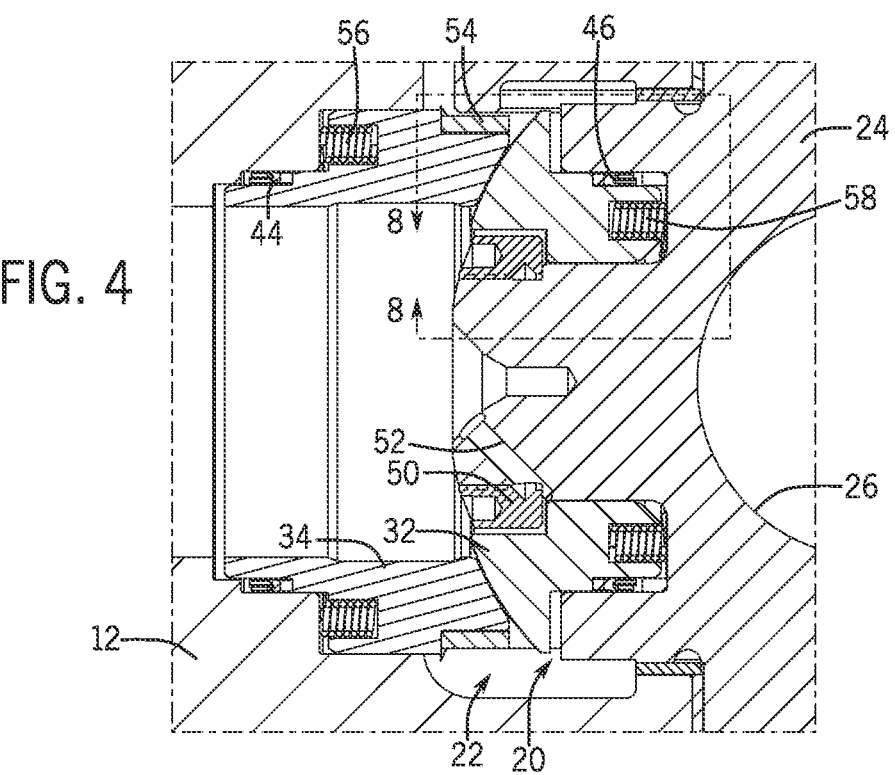
FIG. 4 is a detail view of the flow control assembly of FIG. 2 and illustrates a seat and a counterseat that seal against each other in accordance with one embodiment.

Additional details about the seats 32 and the counterseats 34 may be better understood with reference to FIG. 4, which is a detail view of the upstream sealing assembly having the upstream seat 32 and upstream counterseat 34 of FIG. 2. The downstream sealing assembly depicted in FIG. 2 has the same components as the upstream sealing assembly detailed in FIG. 4. In this depicted embodiment, the seat 32 and the counterseat 34 have mating front surfaces that engage one another when the ball 24 is in the closed position. This causes the seat 32 and the counterseat 34 to seal against one another to prevent flow from the inlet 14 into the cavity 22. The seat 32 and the counterseat 34 may be formed with any suitable materials, but in at least some instances are formed with metal so as to provide metal-to-metal sealing of the seat 32 against the counterseat 34. The seat 32 may be referred to as an integrated seat, in that the seat 32 is installed on and moves with the ball 24 as the valve 10 is opened and closed by rotating the ball 24. Rather than sealing against the ball 24 like seats in some ball valves, the seat 32 is carried by the ball 24 and seals against the counterseat 34.

In at least some embodiments, and as presently shown in FIG. 4, the valve 10 is constructed to allow pressurized fluid from the inlet 14 to flow into a region behind the counterseat 34 (i.e., between the counterseat 34 and the body 12) and into a region behind the seat 32 (i.e., between the seat 32 and the ball 24). Annular seals 44 and 46 inhibit leakage of the pressurized fluid into the cavity 22 from these regions behind the counterseat 34 and the seat 32. The outer diameters of the seals 44 and 46 can be greater than the inner diameter of the area of sealing contact between the seat 32 and counterseat 34. In such cases, when the ball 24 is in the closed position the pressurized fluid from the inlet 14 causes forces along the back ends of the seat 32 and the counterseat 34 that are greater than the forces caused by the pressurized fluid from the inlet 14 along the front faces of the seat 32 and the counterseat 34. This differential causes the seat 32 and the counterseat 34 to push (or "piston") against one another, with the counterseat 34 pushing toward the ball 24 and against the seat 32, and the seat 32 pushing away from the ball 24 and against the counterseat 34.

While the seat 32 and the counterseat 34 in FIG. 4 are each allowed to move under a piston effect from pressurized fluid in the valve, in some other embodiments either or both of the seat 32 and the counterseat 34 may be fixedly held within the body 12 to prevent movement of these components along a radial direction with respect to the ball 24. For example, in certain embodiments the upstream and downstream seats 32 may be allowed to move radially with respect to the ball 24 in response to pressure from fluid received in the valve 10, while the upstream and downstream counterseats 34 are held stationary with respect to the body 12 (or are integrated as parts of the body 12). In other instances, one of the seats 32 may be allowed to move radially with respect to the ball 24 while the other seat 32 is not allowed to do so, or one of the counterseats 34 may be allowed to move in such a manner while the other counterseat 34 is not.

The seat 32 and the counters eat 34 can be retained within the body 12 in any suitable manner. For example, as depicted in FIG. 4, retainers in the form of a retaining ring 50 and a retaining ring 54 are installed in the body 12. The retaining ring 50 is attached to the ball 24 to retain the seat 32 on the ball 24, while the retaining ring 54 is installed to retain the counterseat 34 with the main body 12. The retaining ring 50 is threaded onto the ball 24 in FIG. 4, but could be attached in other ways. The depicted ball 24 also includes a hole 52, and a set screw can be installed in the hole 52 such that the end of the set screw extends into an inner groove of the retaining ring 50 and prevents the retaining ring 50 from inadvertently backing off the ball 24. The retaining rings 50 and 54 in FIG. 4 permit motion of the seat 32 and the counterseat 34 toward and away from the ball 24, but limit the range of this motion. The flow control assembly 20 also includes springs 56 that bias the counterseat 34 toward the ball 24 (and toward the seat 32) and springs 58 that bias the seat 32 away from the ball 24 (and toward the counterseat 34), which may facilitate sealing of the seat 32 against the counterseat 34 in some instances (e.g., in low-pressure applications).

In contrast to the ball valves described above as having seats 32 that are carried by balls 24 and seal against counterseats 34, other known ball valves have seats that are held within main valve bodies and seal against the rotatable balls. In many instances, these seats have conical surfaces that seal against spherical surfaces of the balls. In some embodiments, ball valves 10 having integrated seats 32 on the balls 24 include seats 32 with spherical faces that seal against conical surfaces of the counterseats 34. In other instances, the seats 32 and the counterseats 34 can include mating spherical surfaces that seal against each other (i.e., sphere-to-sphere contact). But in at least some embodiments, the seats 32 and the counterseats 34 are contoured in a different way to promote sealing between these seating components in a consistent, predictable manner.

As described above, the seats 32 and counterseats 34 of the ball valve 10 can move toward or away from the ball 24, and fluid pressure within the ball valve 10 during operation can cause piston effects on these components that push the seats 32 and the counterseats 34 toward or away from the ball 24. These piston effects come from unequal forces on the fronts and backs of the seats 32 and counterseats 34 from fluid pressure in the valve 10, and the net forces on these components from fluid pressure depends on the diameters of the seals 44 and 46 compared to the location and area of sealing contact between the seats 32 and the counterseats 34. Consequently, variation in the location and area of sealing contact between the seats 32 and the counterseats 34 can negatively impact functioning of the seats 32 and the counterseats 34.

Figure 5:
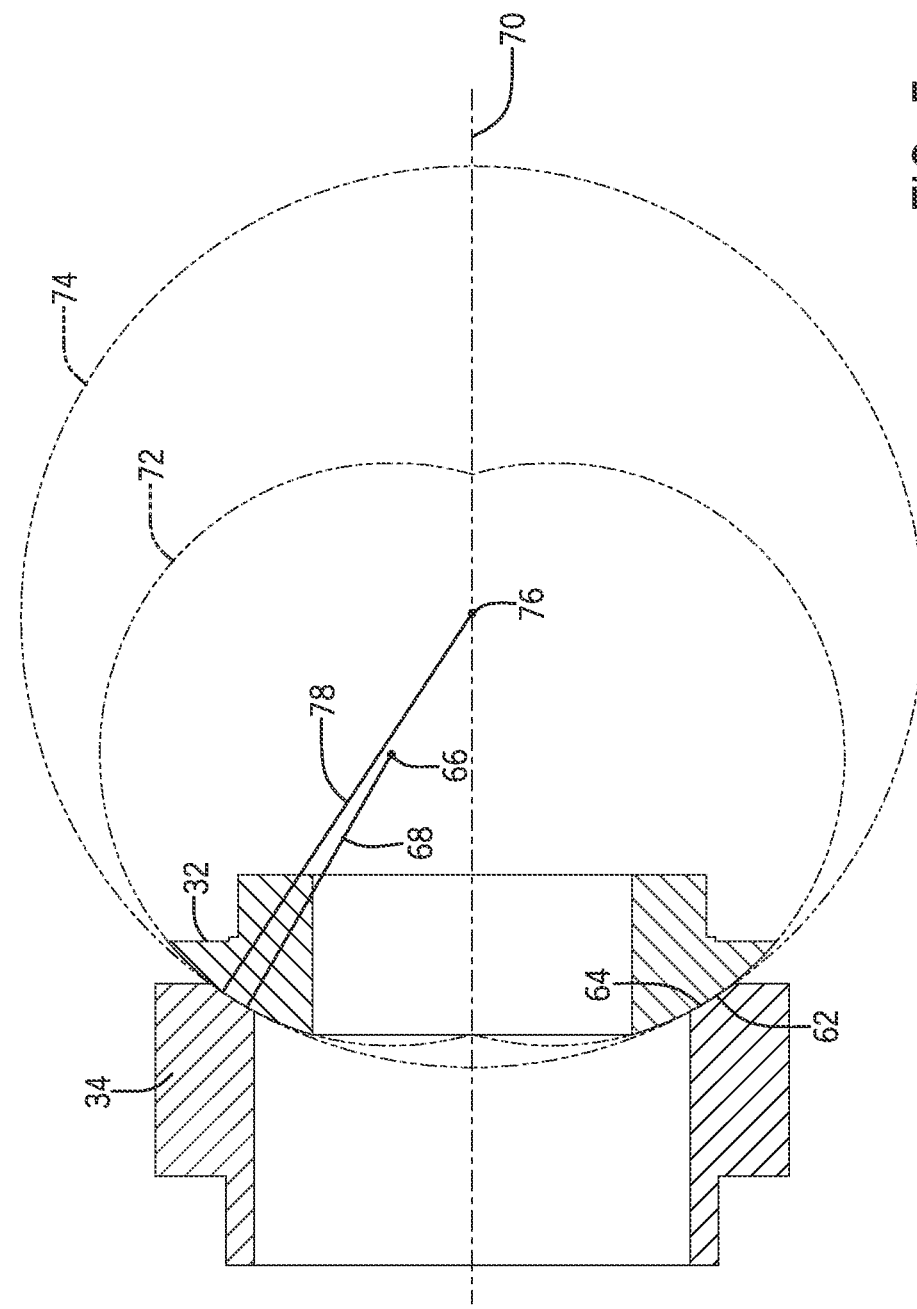
FIG. 5 depicts the seat of the flow control assembly of FIG. 4 as having a toroidal convex contour and the counterseat of the flow control assembly of FIG. 4 as having a spherical concave contour in accordance with one embodiment.

In accordance with certain embodiments, the seats 32 of the ball valve 10 include convex sealing surfaces having a toroidal section or contour. By way of example, a seat 32 is depicted in FIG. 5 as having a toroidal convex surface 62 for engaging and sealing against a concave surface 64 of a counterseat 34. The contour of the toroidal convex surface 62 can be defined by a toroid 72 formed by rotating a circle having a center 66 and a radius 68 about axis 70, and the radius 68 is the radius of curvature of the convex sealing surface 62. As shown in FIG. 5, the concave sealing surface 64 of the counterseat 34 has a radius of curvature greater than that of the convex sealing surface 62 of the seat 32. More particularly, the concave sealing surface 64 is depicted in FIG. 5 as a spherical concave sealing surface 64 defined by a sphere 74 having a center 76 (along the axis 70) and a radius 78, which is the radius of curvature of the concave sealing surface 64. In other embodiments, the concave sealing surface 64 could be defined by a non-spherical shape (e.g., a toroid or cone). The convex sealing surface 62 of the seat 32 could also or instead be defined by a non-toroidal shape (e.g., a sphere). In certain instances, rather than the seat 32 having a toroidal sealing surface 62 and the counterseat 34 having a spherical sealing surface 64, these contours could be switched, with the sealing surface 62 of the seat 32 having a spherical contour and the sealing surface 64 of the counterseat 34 having a toroidal contour. In still other embodiments, the sealing surfaces 62 and 64 can both have toroidal contours, or either of these sealing surfaces can have a toroidal contour while the other has a conical contour.

Figure 6:
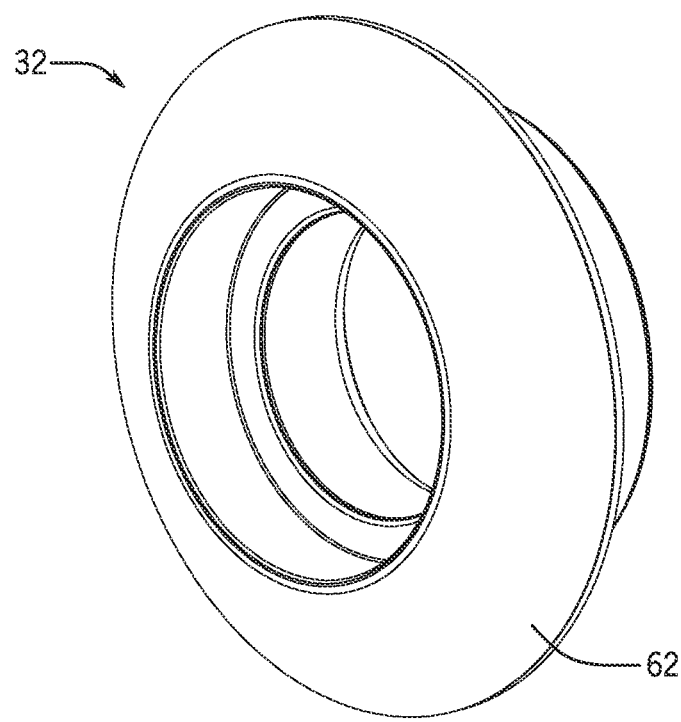
FIG. 6 is a perspective view of the seat of FIG. 4 having the toroidal convex contour in accordance with one embodiment.
Figure 7:
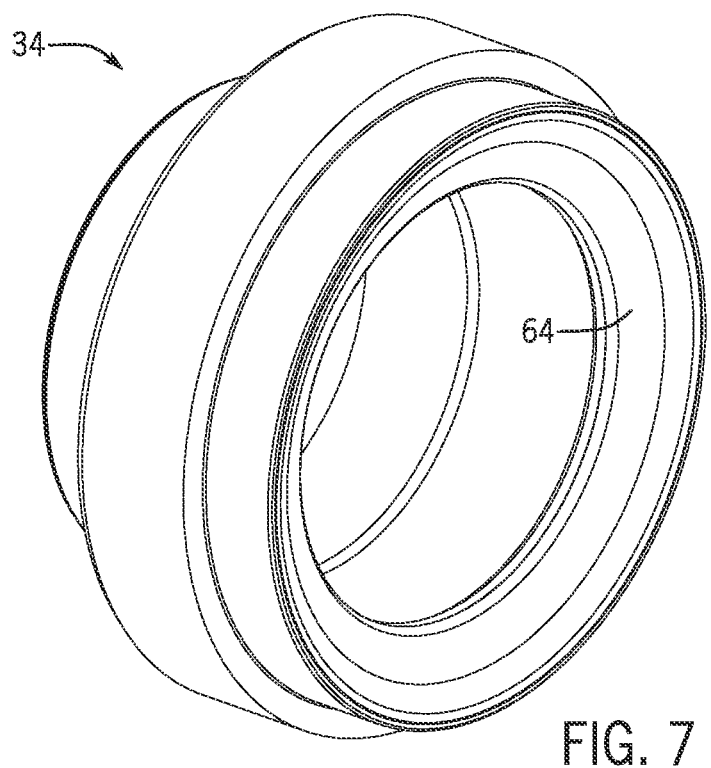
FIG. 7 is a perspective view of the counterseat of FIG. 4 having the spherical concave contour in accordance with one embodiment.

In accordance with at least some embodiments, each of the seats 32 of the ball valve 10 depicted in FIGS. 2 and 4 has a toroidal convex sealing surface 62 and each of the counters eats 34 depicted in FIGS. 2 and 4 has a spherical concave sealing surface 64, as generally described above. The toroidal contour of the sealing surface 62 and the spherical contour of the sealing surface 64 may be better appreciated with reference to FIGS. 6 and 7, which are perspective views of one of the seats 32 and one of the counterseats 34.

Figure 8:
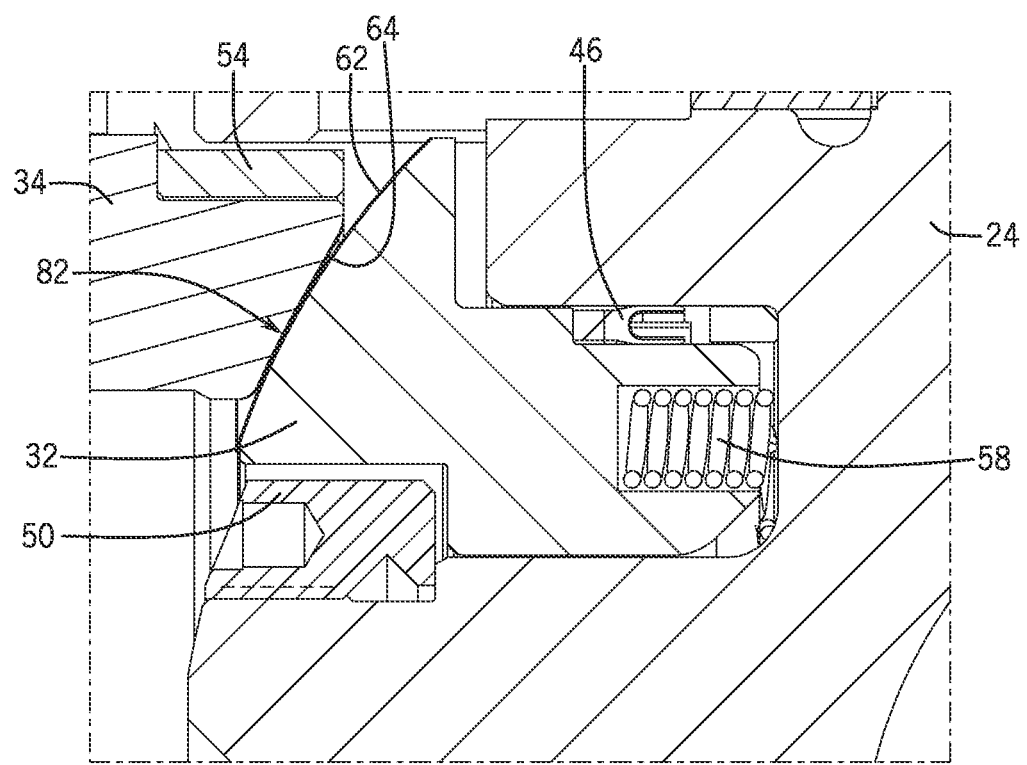
FIG. 8 is a further detail view of engagement of the toroidal convex contour of the seat with the spherical concave contour of the counterseat in accordance with one embodiment.

The seat 32 and the counters eat 34 can seal against each other over a contact area 82 between the contoured sealing surfaces 62 and 64, which is shown in greater detail in FIG. 8. In this depicted embodiment, the rate of curvature of the toroidal contour of the convex sealing surface 62 of the seat 32 is greater than the rate of curvature of the spherical contour of the concave sealing surface 64 of the counterseat 34, resulting in the sealing surface 62 curving away from the contact area 82 at a greater rate than does the sealing surface 64. This geometric arrangement with a toroidal contour of the seat sealing surface 62 may reduce the area of contact (and increase sealing pressure) between the seat 32 and the counterseat 34 and enable the seat 32 and the counters eat 34 to maintain a more predictable area of contact that is narrow and better approximates a circular line of contact compared to arrangements in which both the seat and the counterseat have spherical sealing surfaces. The presently described geometric arrangement with the toroidally contoured seat 62 may also allow for greater deviations in the positions of the seat and the counterseat compared to arrangements in which the seat has a spherical sealing surface and the counterseat has a conical sealing surface.

Although the ball valve 10 has identical upstream and downstream seats 32 with toroidally contoured sealing surfaces 62 in some embodiments, either or both seats 32 can have sealing surfaces 62 that do not have a toroidal contour in other embodiments. Similarly, while identical upstream and downstream counterseats 34 can have spherical sealing surfaces 64, either or both counterseats 34 can have sealing surfaces 64 that are not spherically contoured.

Figure 9:
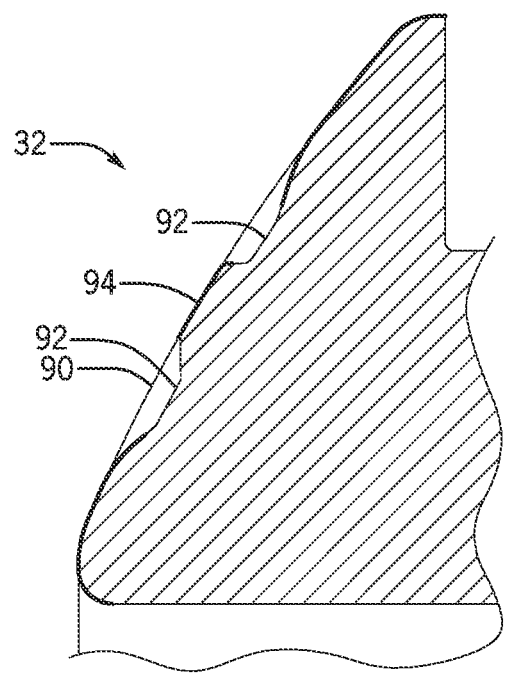
FIG. 9 is a section view of a seat of a flow control assembly of a ball valve and depicts the seat as having two recesses that define a sealing surface of the seat in accordance with one embodiment.

An example of a different seat 32 for use in a ball valve 10 is shown in FIG. 9. In this depicted embodiment, the seat 32 includes a convex surface 90 having annular grooves 92 that define a sealing surface 94. The annular grooves 92 limit the area of the sealing surface 94 and, compared to some other designs, allow the sealing force to be concentrated at a smaller contact area (i.e., along the sealing surface 94) when the seat 32 seals against a counterseat 34. The sealing surface 94 can have a radius of curvature equal to those of the other portions of the convex surface 90 shown above and below both grooves 92 in FIG. 9, but in at least some instances the radius of curvature of the sealing surface 94 is smaller than those of the other portions of the convex surface 90 to increase concentration of sealing force at the surface 94 and increase sealing pressure over the contact area.

As noted above with respect to FIG. 4, the seat 32 and the counterseat 34 of the ball valve 10 seal against one another during valve operation when the ball 24 is in the closed position and differential forces on the seat 32 and counterseat 34 from pressurized fluid in the valve 10 can push these components more tightly together. In some instances, such as in certain high-pressure conditions with large volumes of flowing gas, point loading stress on the seat 32 and the counterseat 34 from this pressure-assisted sealing, if left unchecked, could damage these components when the ball 24 is rotated from the closed position to the open position.

Figure 10:
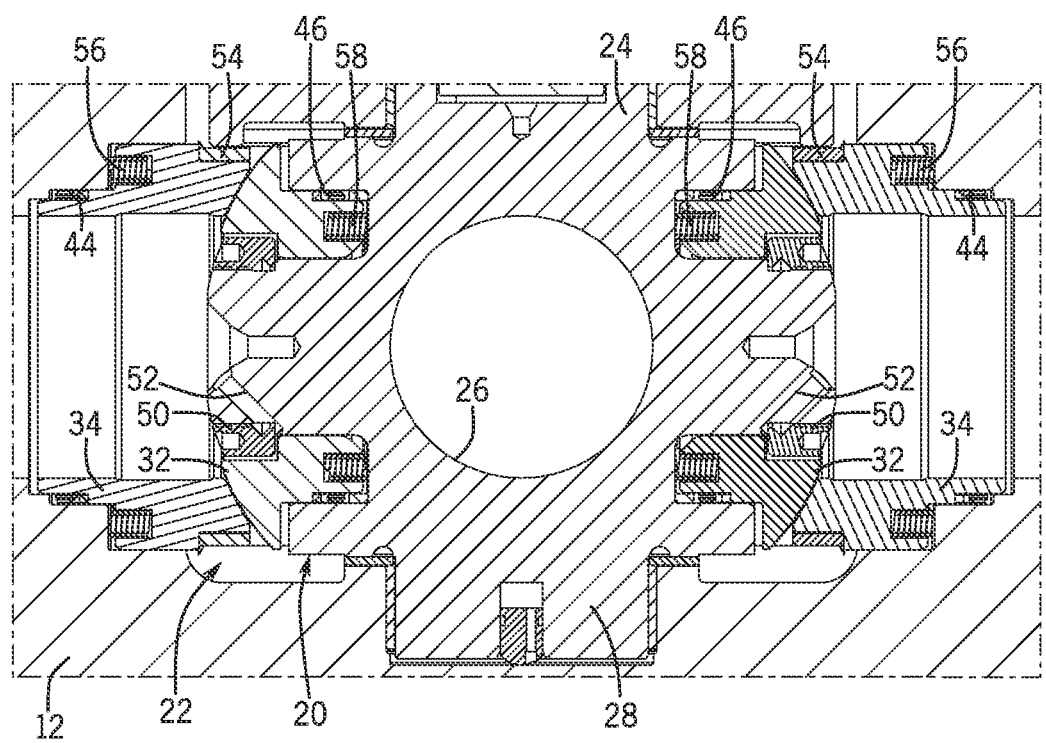
FIGS. 10 and 11 are vertical and horizontal cross-sections of the ball valve of FIG. 1 that show upstream and downstream seats and counterseats that can each move toward and away from the ball in response to fluid pressure during operation in accordance with one embodiment.
Figure 11:
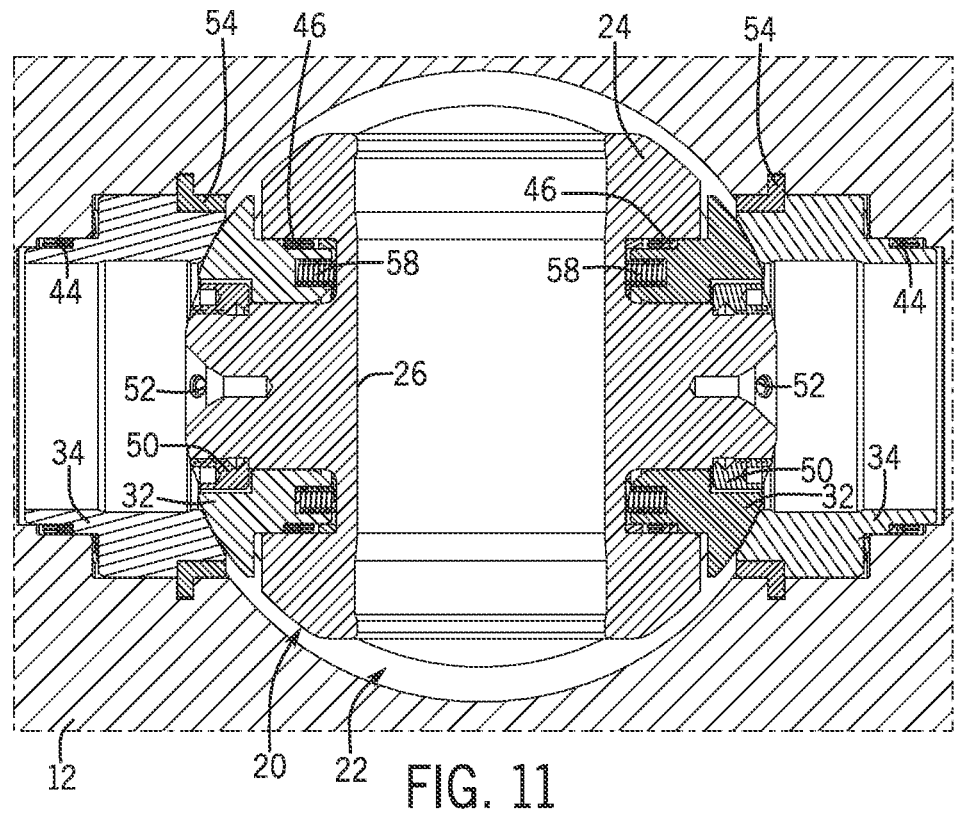

In at least some embodiments, however, the valve 10 is constructed to have the seat 32 or the counterseat 34 retract to separate the seat 32 from the counterseat 34 as the valve is opened. An example of these seating components retracting during opening of the valve may be better understood with reference to FIGS. 10-14. In the vertical cross-section of FIG. 10 and the horizontal cross-section of FIG. 11, the ball valve 10 is shown as closed, with the ball 24 rotated to the closed position and the seats 32 sealing against the counterseats 34. As described above, the seats 32 are retained on the ball 24 and the counterseats are retained in the body 12, but each of the seats 32 and the counterseats 34 in this depicted embodiment are allowed a range of motion to move toward or away from the ball 24. When the valve 10 is pressurized in this closed position, the pressure within the valve 10 can cause the seats 32 to push away from the ball 24 (and against the counterseats 34) and the counterseats 34 to push toward the ball 24 (and against the seats 32), as also discussed above.

Figure 12:
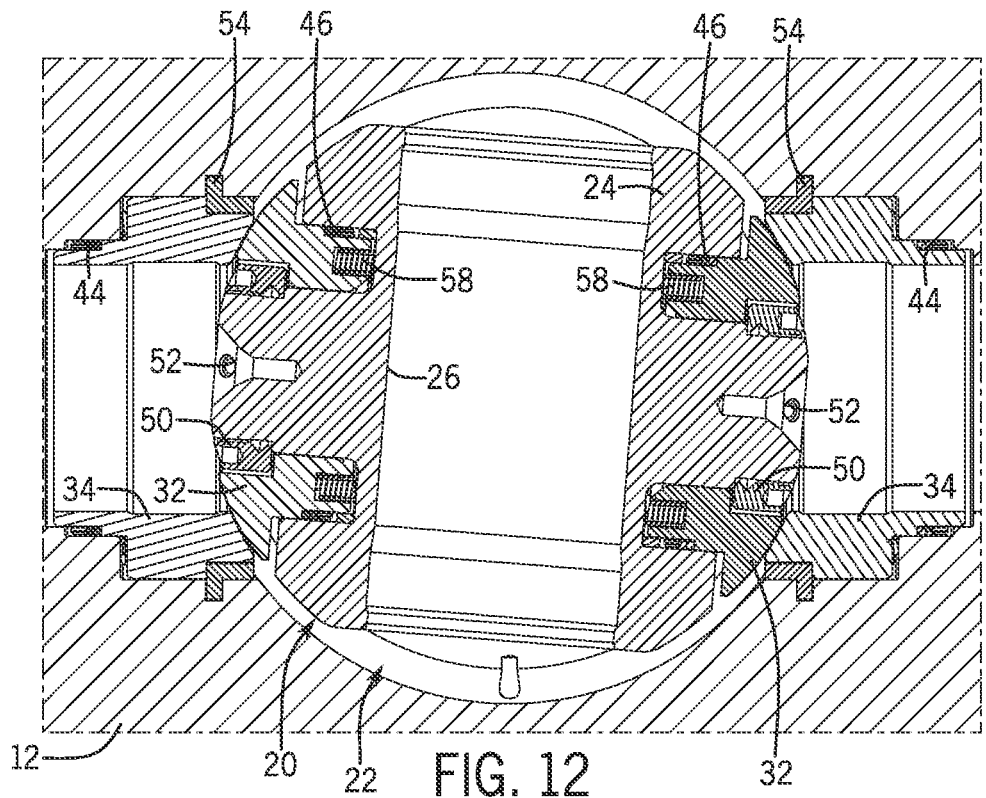
FIG. 12 is a horizontal cross-section of the portion of the valve depicted in FIG. 11 as the ball is rotated from the closed position toward the open position in accordance with one embodiment.
Figure 13:
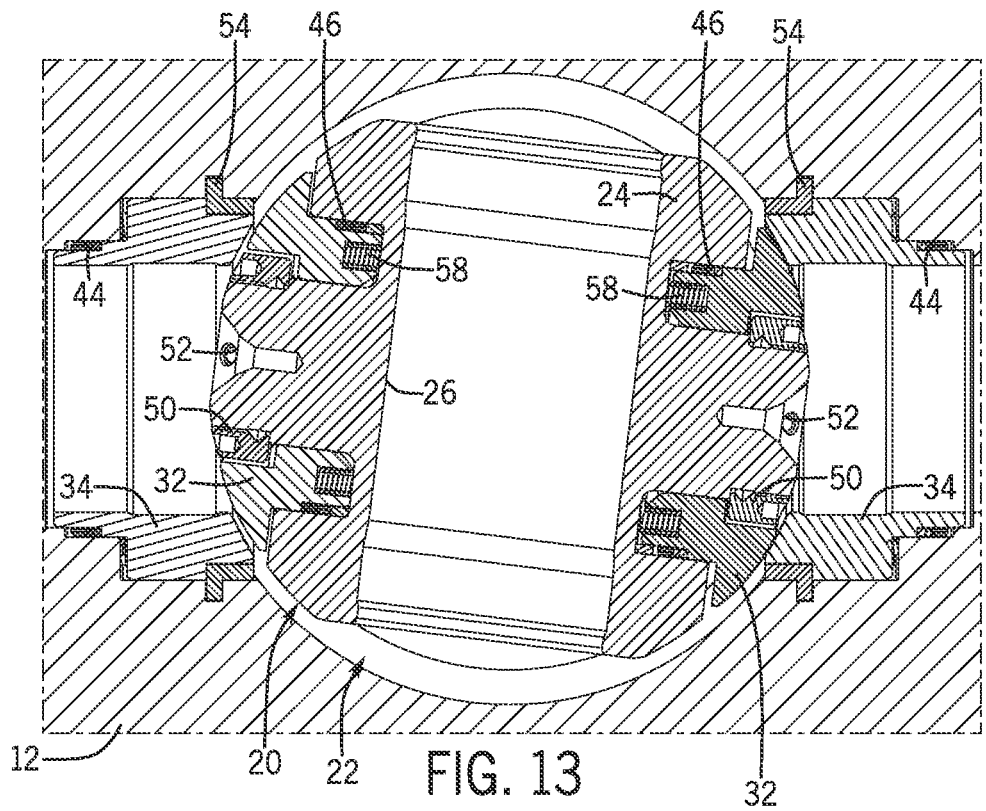
FIG. 13 generally depicts the ball of FIG. 12 rotated further toward the open position and shows separation of the upstream seat from the upstream counterseat in accordance with one embodiment.
Figure 14:
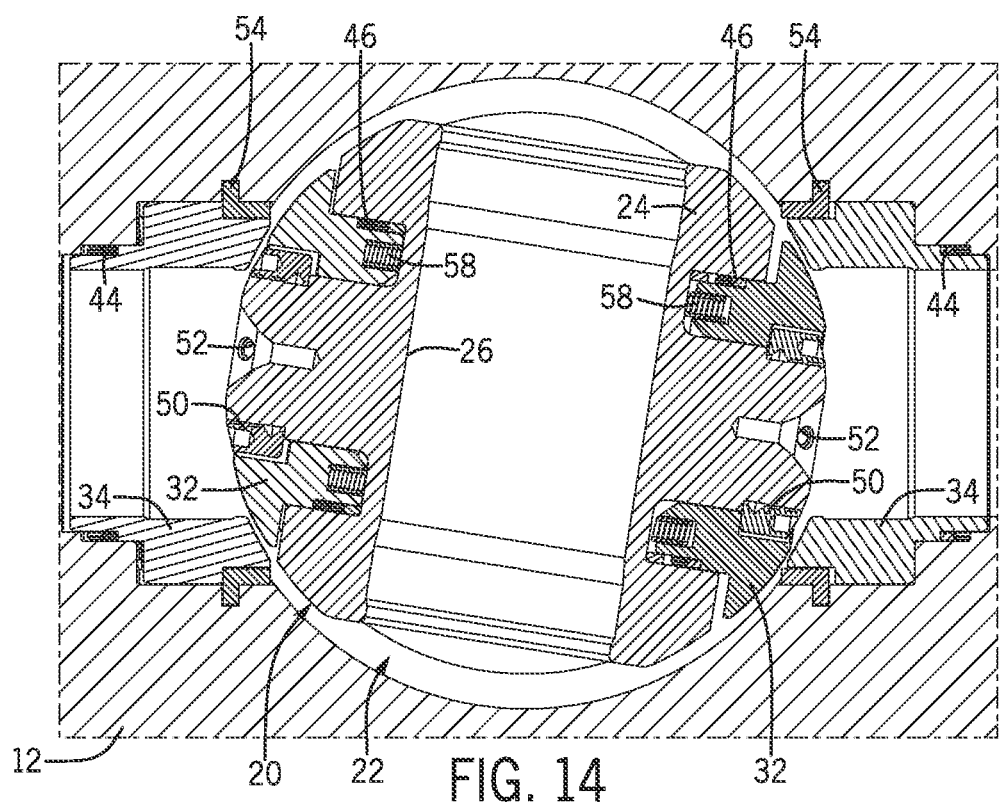
FIG. 14 generally depicts the ball of FIG. 13 rotated still further toward the open position and shows separation of the downstream counterseat from the downstream seat in accordance with one embodiment.

More specifically, with the upstream seat 32 and upstream counterseat 34 to the left of the ball 24 in FIGS. 10-14 and the downstream seat 32 and downstream counterseat 34 to the right of the ball 24, when the valve 10 is closed and pressurized the upstream counterseat 34 pistons in the direction of flow through the valve 10 (from inlet 14 to outlet 16), while the upstream seat 32 pistons against the direction of flow through the valve 10. As the valve 10 is opened, however, the fluid within the valve 10 can cause the seats 32 and the counterseats 34 to separate by reversing direction of some of these components with respect to the ball 24. FIGS. 12-14 generally depict rotation of the ball during opening of the valve and separation of the seats 32 and counterseats 34 caused by the pressurized fluid in the valve. As the ball 24 is rotated from the closed position toward the open position, the pressurized fluid acting on the upstream seat 32 causes the upstream seat 32 to reverse direction and push instead toward the ball 24 and away from the upstream counterseat 34. This in turn causes the upstream seat 32 to retract toward the ball 24 and separate from the upstream counterseat 34, as shown in FIG. 13. The upstream counterseat 34 can continue to push in the downstream direction as the valve is opened, but is restrained by its retaining ring 54.

During opening of the valve 10, the pressurized fluid also acts on the downstream counterseat 34 to cause the downstream counterseat 34 to reverse direction, move instead in the direction of flow through the valve 10, and separate from the downstream seat 32, as shown in FIG. 14. The downstream seat 32 can piston away from the ball 24 as the valve opens, but movement of the downstream seat 32 away from the ball 24 is limited by the downstream retaining ring 50. In at least some instances, separation of the seats 32 from the counterseats 34 during opening of the valve 10 can reduce contact stress and wear on these components, reduce run torques, allow use of smaller actuators, reduce or eliminate potential galling, and increase valve cycle life.

Figure 15:
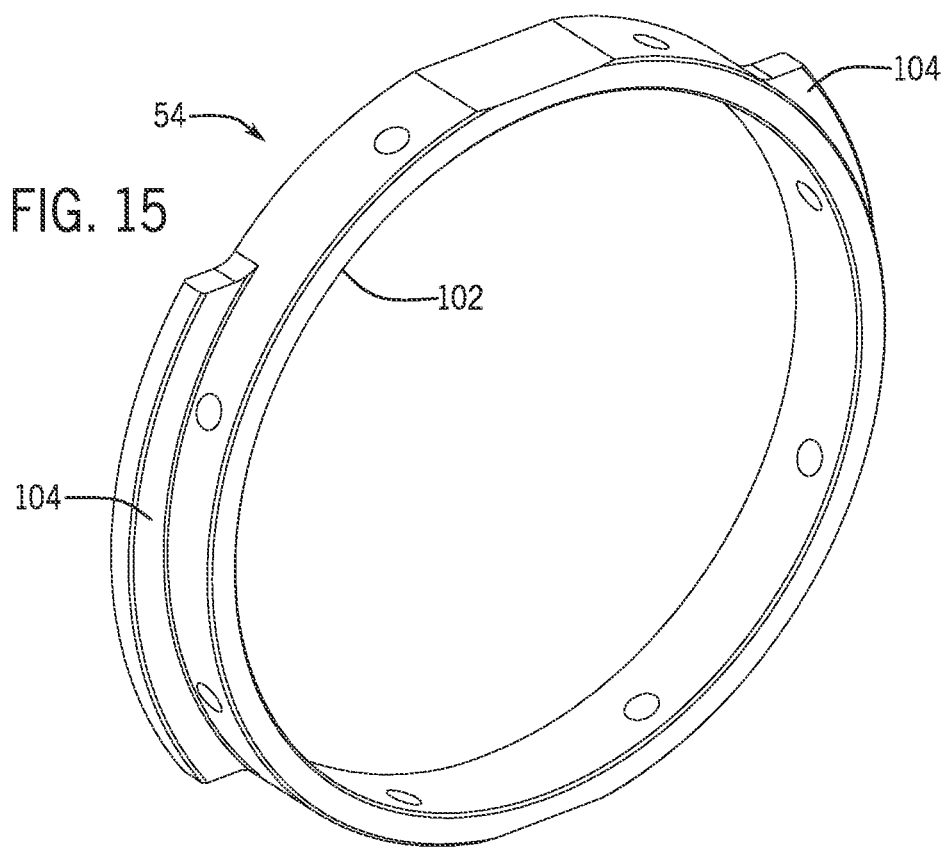
FIG. 15 depicts a retaining ring of the ball valve of FIG. 1 for retaining a counters eat within the valve body in accordance with one embodiment.
Figure 16:
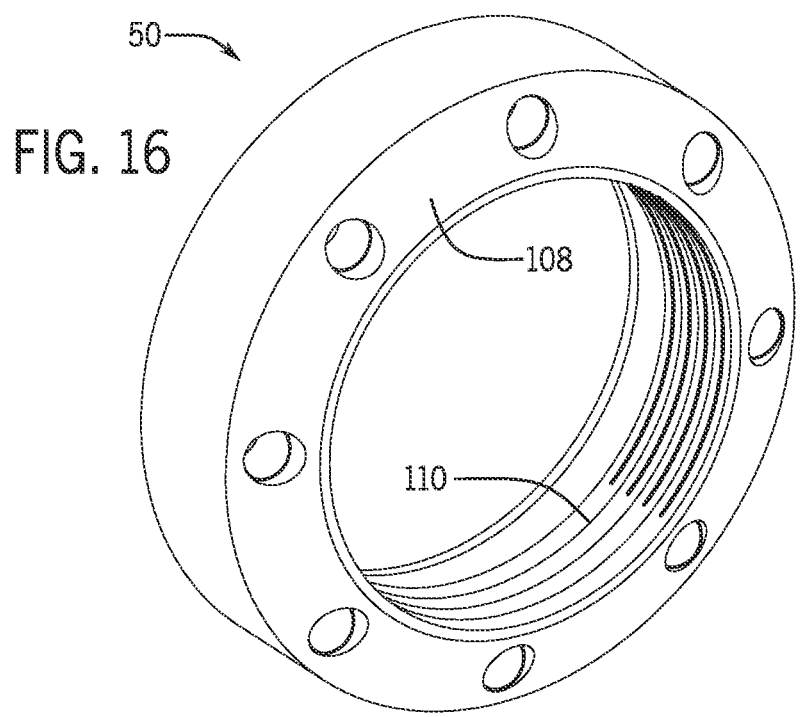
FIG. 16 depicts a retaining ring of the ball valve of FIG. 1 for retaining a seat on the ball in accordance with one embodiment.
Figure 17:
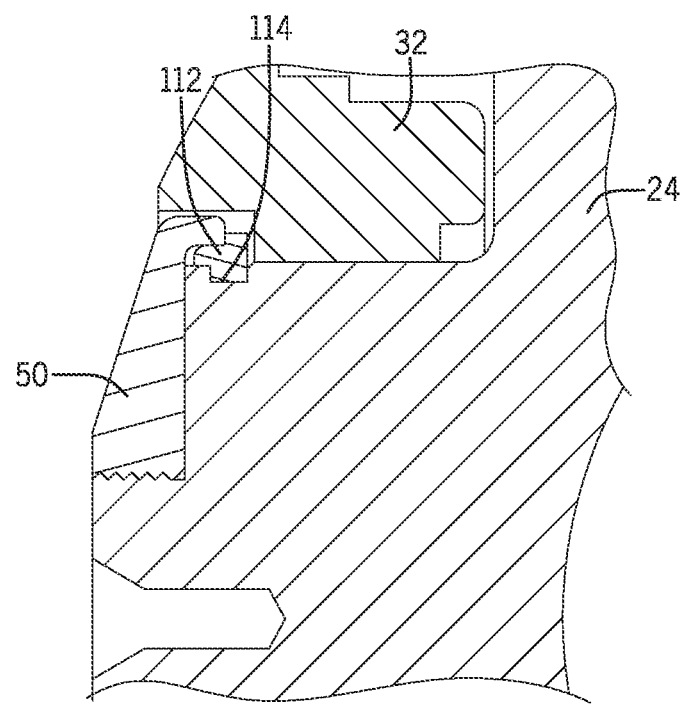
FIG. 17 depicts a seat retained on a ball of a ball valve with retaining segments and a retaining ring in accordance with one embodiment.

As noted above, the seats 32 can be retained on the ball 24 and the counterseats 34 can be retained in the body 12 in any suitable manner. A retaining ring 54 for retaining a counters eat 34 is depicted in FIG. 15 and a retaining ring 50 for retaining a seat 32 is depicted in FIG. 16 in accordance with some embodiments. As depicted in FIG. 15, the retaining ring 54 has an annular body 102 with lateral tabs 104 that engage mating slots in the body 12 to hold the retaining ring 54 in position, as may generally be seen in FIGS. 11-14. The retaining ring 50 is depicted in FIG. 16 as having an annular body 108 with a threaded surface 110, which allows the ring 50 to be threaded onto a mating threaded surface of the ball 24. In another embodiment generally depicted in FIG. 17, a seat 32 is retained on a ball 24 by retaining segments 112 received in a groove 114 (e.g., an annular groove) in the ball 24. These segments 112 can themselves be retained in the groove 114 by a retaining ring 50 threaded onto the ball 24.

Figure 18:
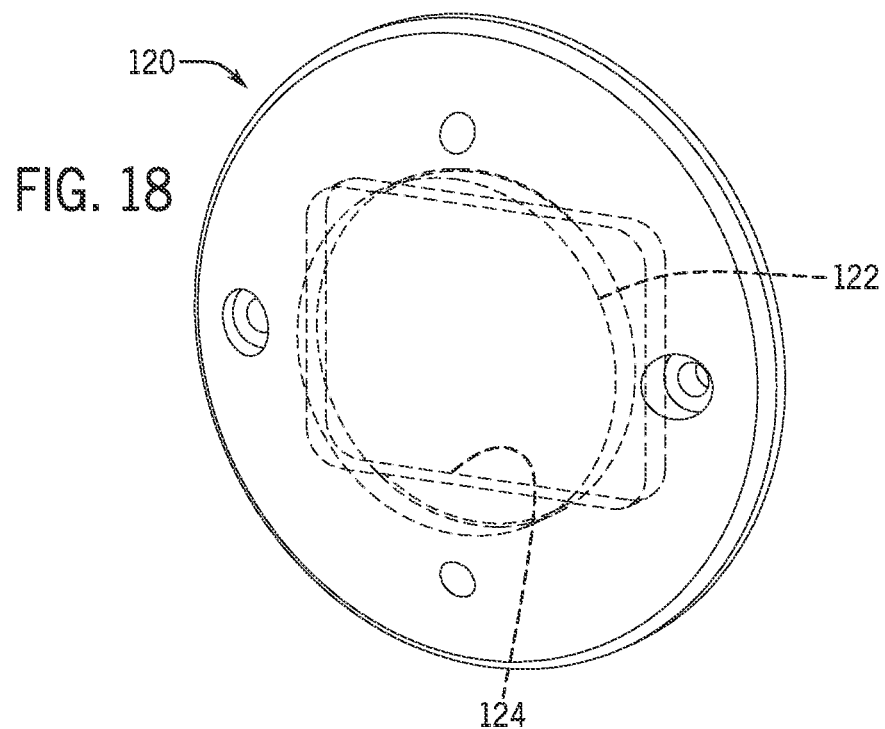
FIGS. 18-20 illustrate a cap for retaining a seat on a ball of a ball valve in accordance with one embodiment.
Figure 19:
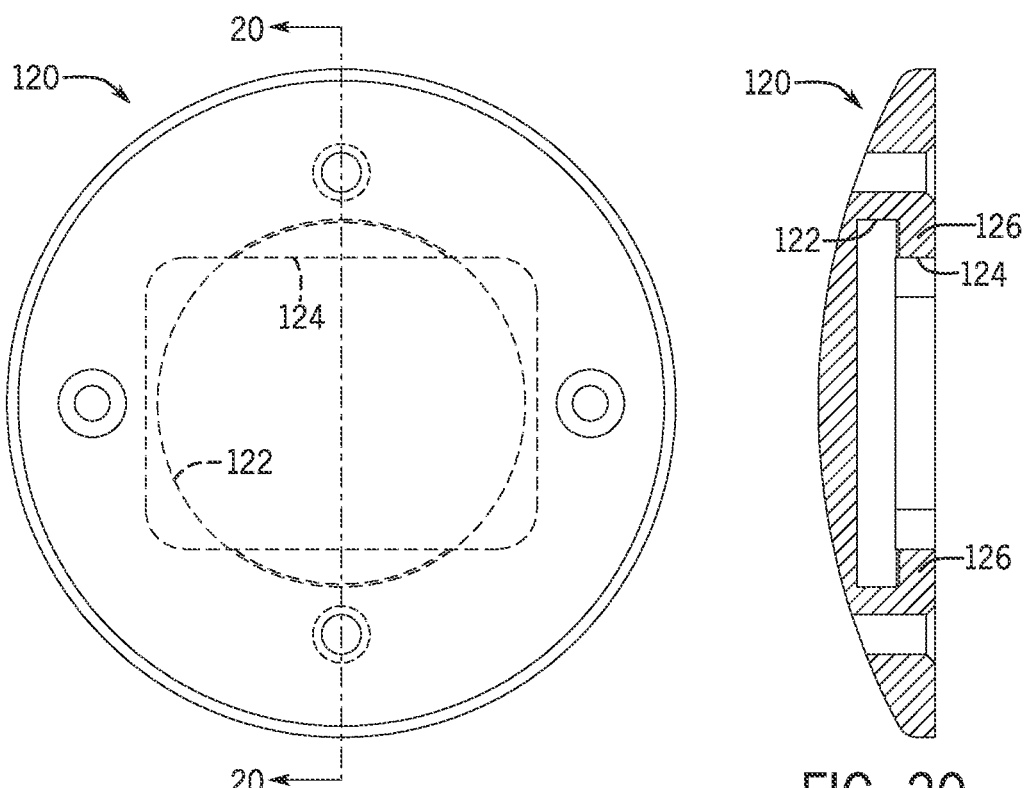
Figure 20:
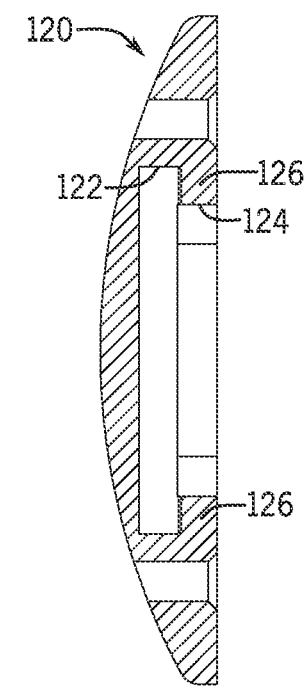

Although fluid pressure can be used to piston the seating surfaces apart during opening of the valve 10 in the manner described above, in other embodiments the seats 32 can be mechanically retracted toward the ball 24 and away from the counterseats 34 as the valve 10 opens. In some instances, the seats 32 are retained on the ball 24 by a retainer that pushes the seats 32 away from the counterseats 34 during opening of the valve 10. An example of such a retainer is depicted as a cap 120 in FIGS. 18-20. In this depicted embodiment, the cap 120 includes a cylindrical cavity 122 accessible through a rectangular opening 124 in the rear face of the cap 120. The cap 120 also includes shoulders 126 attributable to a difference between the width of the rectangular opening 124 and the diameter of the cavity 122. As further discussed below, these shoulders 126 can facilitate retention of the cap 120 on a mating portion of the ball 24. Although the cavity 122 does not reach the front face of the cap 120 in FIGS. 18-20, the cavity 122 could extend to the front face in other embodiments and give the cap 120 an annular shape.

Figure 21:
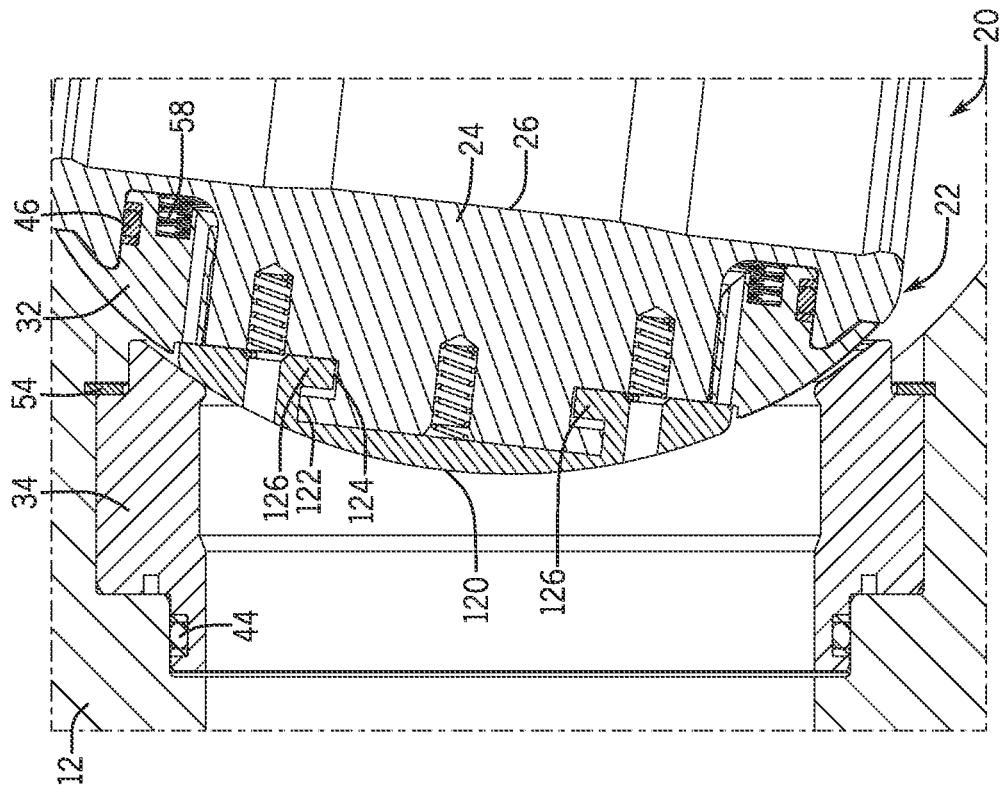
FIGS. 21 and 22 show the cap of FIGS. 18-20 installed on a ball of a ball valve so as to retain a seat on the ball, and to mechanically retract the seat from a counterseat, as the ball is opened in accordance with one embodiment.

The cap 120 can be used to retain a seat 32 on the ball 24 within the main body 12 of a ball valve 10, and an example of this is generally shown in FIG. 21. In this depicted embodiment, the cap 120 is received on a protruding portion of the ball 24 and retained through engagement of the shoulders 126 with mating shoulders of the ball 24 that are received in the cavity 122 of the cap 120. During assembly, the cap 120 may be oriented to allow the mating shoulders of the ball 24 to be received into the cavity 122 through the rectangular opening 124. The cap 120 may then be turned (e.g., by a quarter turn) to align the shoulders 126 of the cap 120 with the mating shoulders of the ball 24 in the manner shown in FIG. 21. The cap 120 and the protruding portion of the ball 24 are sized so as to allow radial movement of the cap 120 with respect to the ball 24 when installed. Springs in the ball 24 bias the cap 120 in a radially outward direction.

The seat 32 of FIG. 21 is installed on the ball 24 and seals against a counterseat 34 when the ball 24 is in the closed position. In this embodiment, the seat 32 is allowed to piston against the counterseat 34 in response to fluid pressure, as generally described above, but the counterseat 34 is held in place in the main body 12 by a retaining ring 54. In other embodiments, the counterseat 34 could also or instead be allowed to move toward and away from the ball 24 in response to fluid pressure. Further, although the seat 32 can have a toroidal convex surface for sealing against a concave surface of the counterseat 34, either or both of the seat 32 and the counterseat 34 could have a different contour in other embodiments.

The cap 120 is shaped to operate as a cam for mechanically retracting the seat 32 from the counterseat 34. More particularly, as the valve of FIG. 21 is opened, the cap 120 rotates with the ball 24 and contacts the counters eat 34. As the ball 24 continues to rotate, the counterseat 34 pushes the cap 120 radially inward on the ball 24. This, in turn, causes the cap 120 to drive the seat 32 radially inward against biasing springs 58 and apart from the counterseat 34. And as noted above, separation of the seat 32 from the counterseat 34 during valve opening may facilitate operation, reduce the likelihood of galling, and increase valve cycle life. Although only one seat 32 and one counterseat 34 are shown in FIGS. 21 and 22 for explanatory purposes, it will be appreciated that caps 120 can be used with seats 32 and counterseats 34 on either or both the upstream side and the downstream side of the ball 24 in accordance with the present techniques.

Figure 22:
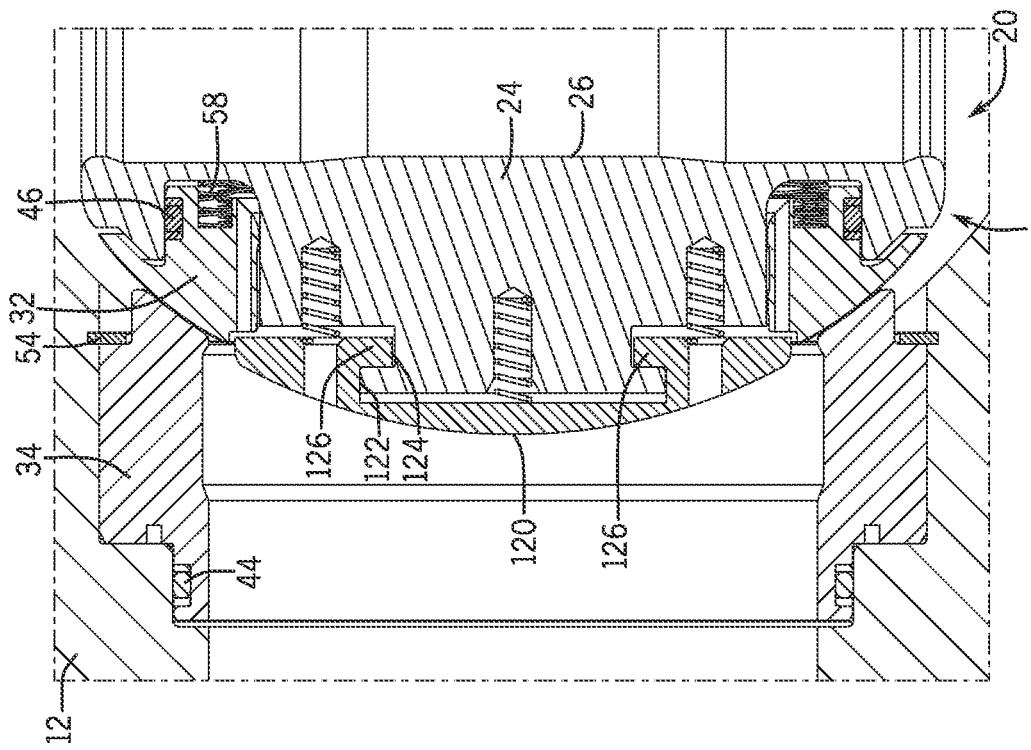
Figure 23:
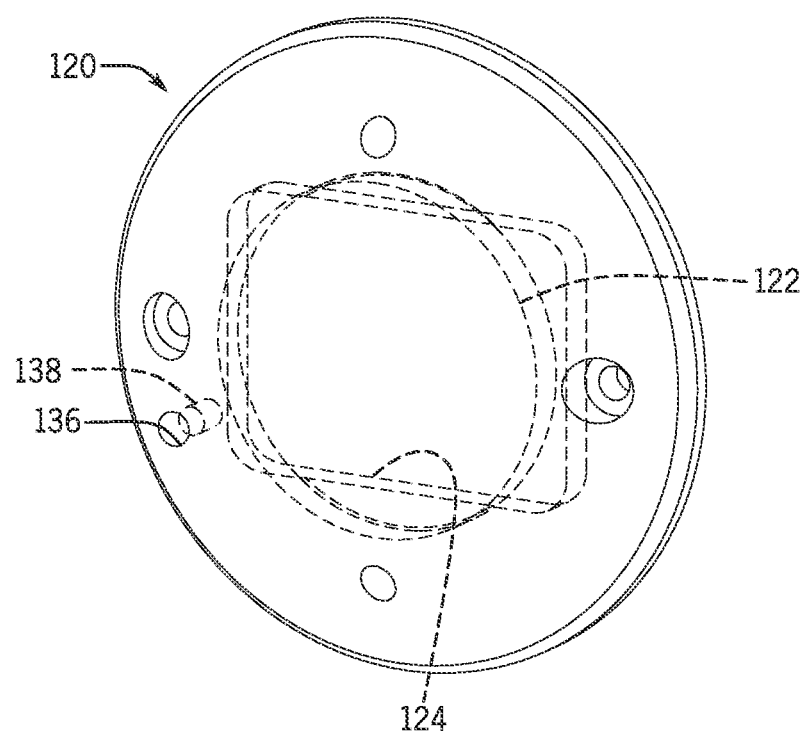
FIG. 23 generally depicts a retaining cap like that of FIGS. 18-22, but with a pressure-relief port that allows fluid to exit a region between the cap and the ball in accordance with one embodiment.

In some instances, pressurized fluid could become trapped between the cap 120 and the ball 24 of FIGS. 21 and 22 during operation. Accordingly, as generally depicted in FIG. 23, the cap 120 may include a pressure-relief port 136 to allow pressurized fluid to escape from behind the cap 120. Any suitable check valve 138 can be installed in the pressure-relief port 136 to allow fluid to escape from behind the cap 120 through the port 136 to a lower-pressure region while preventing fluid from flowing to the backside of the cap 120 through the port 136. Although FIG. 23 depicts a single port 136 with one check valve 138, the cap 120 could have multiple ports 136 and check valves 138. The pressure-relief port 136 and check valve 138 could also be used to relieve pressure from behind caps 120 (or other retainers) that retain the seat 32 but do not mechanically retract the seat 32 inwardly on the ball 24.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve comprising:
   a body; and
   a flow control assembly inside the body, the flow control assembly including:
      a ball rotatable between an open position and a closed position to control flow through the body;
      a seat installed on the ball in a manner that permits radial movement of the seat with respect to the ball inside the body; and
      a counterseat installed in the body in a manner that permits radial movement of the counterseat with respect to the ball inside the body, the seat and the counterseat having mating surfaces that engage one another when the ball is in the closed position such that the seat seals against the counterseat within the body along the mating surfaces;
      wherein the flow control assembly is configured to allow pressurized fluid in the body to enter a region between the seat and the ball and a region between the counterseat and the body so as to cause a net force on the seat from the pressurized fluid that pushes the seat away from the ball and against the counterseat when the ball is in the closed position and a net force on the counterseat from the pressurized fluid that pushes the counterseat toward the ball and against the seat when the ball is in the closed position and wherein the flow control assembly is configured such that the pressurized fluid pushes the seat toward the ball and away from the counterseat when the ball is rotated from the closed position to the open position.

2. The valve of claim 1, wherein the flow control assembly includes:
   an additional seat installed on the ball in a manner that permits radial movement of the additional seat with respect to the ball inside the body; and
   an additional counterseat installed in the body in a manner that permits radial movement of the additional counterseat with respect to the ball inside the body, the additional seat and the additional counterseat having mating surfaces that engage one another when the ball is in the closed position such that the additional seat seals against the additional counterseat within the body along the mating surfaces of the additional seat and the additional counterseat.

3. The valve of claim 2, wherein the flow control assembly is configured such that, during operation, the additional seat and the additional counterseat push against one another when the ball is in the closed position.

4. The valve of claim 3, wherein the flow control assembly is configured such that the pressurized fluid pushes the additional counterseat away from the ball and away from the additional seat when the ball is rotated from the closed position to the open position.

5. The valve of claim 1, comprising a retainer attached to the ball to retain the seat on the ball.

6. The valve of claim 5, wherein the retainer includes a retaining ring attached to the ball.

7. The valve of claim 1, wherein the seat is spring-biased in a first radial direction away from the ball and the counterseat is spring-biased in a second radial direction toward the ball.

8. The valve of claim 1, wherein the valve is a trunnion-mounted ball valve.

9. A valve comprising:
a hollow valve body having an inlet and an outlet;
a ball positioned within the hollow valve body, wherein the ball is rotatable between an open position and a closed position to control flow through the hollow valve body from the inlet to the outlet;
an upstream sealing assembly within the body on an inlet side of the ball, wherein the upstream sealing assembly includes a seat coupled to rotate with the ball inside the hollow valve body between the open and closed positions and a counterseat installed in the body; and
a downstream sealing assembly within the body on an outlet side of the ball, wherein the downstream sealing assembly also includes a seat coupled to rotate with the ball inside the hollow valve body between the open and closed positions and a counterseat installed in the body;
wherein the counterseat of the upstream sealing assembly and the counterseat of the downstream sealing assembly are movable within the hollow valve body along a flow path from the inlet to the outlet during valve operation, and the seat of the upstream sealing assembly and the seat of the downstream sealing assembly are radially movable with respect to the ball during valve operation,
wherein the valve is configured such that, when the ball is in the closed position during valve operation, fluid pressure on the upstream sealing assembly causes the seat of the upstream sealing assembly to push toward the counterseat of the upstream sealing assembly and the counterseat of the upstream sealing assembly to push toward the seat of the upstream sealing assembly, and
wherein the valve is configured such that, when rotating the ball from the closed position to the open position during valve operation, the fluid pressure on the upstream sealing assembly causes the seat of the upstream sealing assembly to reverse direction and push toward the ball and away from the counterseat of the upstream sealing assembly.

10. The valve of claim 9, wherein the valve is configured such that, when rotating the ball from the closed position to the open position during valve operation, fluid pressure on the downstream sealing assembly causes the seat of the downstream sealing assembly to push toward the counterseat of the downstream sealing assembly and the counterseat of the downstream sealing assembly to push away from the seat of the downstream sealing assembly.

11. A method comprising:
receiving fluid in a ball valve having: a hollow main body, a ball rotatable within the hollow main body between an open position and a closed position to control flow of the fluid through the ball valve, a seat disposed on and rotatable with the ball, and a counterseat in the hollow main body;
rotating the ball to the closed position, wherein rotating the ball to the closed position causes: the seat to seal against the counterseat, and pressure from the fluid to push the seat away from the ball and against the counterseat; and
rotating the ball from the closed position toward the open position, wherein rotating the ball from the closed position toward the open position causes the seat to contract radially inward with respect to the ball and to separate from the counterseat.

12. The method of claim 11, wherein rotating the ball to the closed position causes the fluid to push the counterseat toward the ball and against the seat, and rotating the ball from the closed position toward the open position causes the fluid to push the seat toward the ball and away from the counterseat while the fluid continues to push the counterseat toward the ball.

13. The method of claim 12, wherein the seat and the counterseat are positioned on the upstream side of the ball within the hollow main body when the ball is in the closed position such that rotating the ball to the closed position causes the fluid to push the seat away from the ball opposite a flow direction through the ball valve and causes the fluid to push the counterseat toward the ball in the flow direction through the ball valve.

14. The method of claim 13, wherein the ball valve includes an additional seat disposed on and rotatable with the ball and an additional counterseat in the hollow main body, and the additional seat and the additional counterseat are positioned on the downstream side of the ball within the hollow main body when the ball is in the closed position such that rotating the ball to the closed position causes the additional seat to seal against the additional counterseat.

15. The method of claim 14, wherein rotating the ball from the closed position toward the open position causes the fluid to push the additional counterseat away from the ball in the flow direction through the ball valve to release the additional counterseat from the additional seat.

16. The method of claim 12, wherein rotating the ball from the closed position toward the open position causes the fluid to push the counterseat toward the ball and against a counterseat retainer that limits movement of the counterseat within the hollow valve body.

17. The method of claim 11, wherein the ball valve includes a cap coupled to the ball, wherein rotating the ball from the closed position toward the open position causes the counterseat to push the cap radially inward with respect to the ball such that the cap pushes the seat and causes the seat to contract radially inward with respect to the ball and to separate from the counterseat.

\* \* \* \* \*